(12) United States Patent  (10) Patent No.: US 8,947,454 B2
Hashikawa et al.                (45) Date of Patent:     Feb. 3, 2015

(54) DISPLAY DEVICE FOR VEHICLE

(75) Inventors: Nobuko Hashikawa, Saitama (JP);
Junichiro Onaka, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 13/505,036

(22) PCT Filed: Nov. 1, 2010

(86) PCT No.: PCT/JP2010/069412
§ 371 (c)(1),
(2), (4) Date: Apr. 30, 2012

(87) PCT Pub. No.: WO2011/055699
PCT Pub. Date: May 12, 2011

(65) Prior Publication Data
US 2012/0218295 A1    Aug. 30, 2012

(30) Foreign Application Priority Data

Nov. 4, 2009 (JP) .................................. 2009-252763

(51) Int. Cl.
*G09G 5/00*     (2006.01)
*B60K 35/00*    (2006.01)
*G01D 7/02*     (2006.01)

(52) U.S. Cl.
CPC ...... *B60K 35/00* (2013.01); *G01D 7/02* (2013.01);
*B60K 2350/1068* (2013.01); *B60K 2350/1064*
(2013.01); *B60K 2350/1096* (2013.01); *B60K*
*2350/2052* (2013.01); *B60K 2350/965*
(2013.01)
USPC .......................... 345/629; 345/619; 340/425.5

(58) Field of Classification Search
USPC ................. 345/7, 84, 690, 55, 173, 629, 619;
340/425.5; 348/148
See application file for complete search history.

(56) References Cited

U.S. PATENT DOCUMENTS

2005/0154505 A1*  7/2005  Nakamura et al. .......... 340/425.5
2008/0158096 A1*  7/2008  Breed ................................ 345/7

(Continued)

FOREIGN PATENT DOCUMENTS

CN    101057269    10/2007
CN    101448680    6/2009

(Continued)

OTHER PUBLICATIONS

European Search Report dated Jul. 17, 2013, Application No. 10828259.1, 3 pages.
Chinese Office Action and English translation dated May 6, 2014, 16 pages.

*Primary Examiner* — Chante Harrison
(74) *Attorney, Agent, or Firm* — Rankin, Hill & Clark LLP

(57) ABSTRACT

In a display device for a vehicle displays information on a second layer of a first display screen when a display state is changed, the display device displays, on the second layer of the second display screen, an icon corresponding to the information, the display device displays a predetermined image so that the predetermined image displayed on the first layer of the first display screen is different from the predetermined image displayed on the first layer of the second display screen, thereafter, the display device gradually changes the image displayed on the first layer of the first display screen so that a part of or the entirety of the predetermined image displayed on the first layer of the first display screen is the same as the predetermined image displayed on the first layer of the second display screen.

4 Claims, 8 Drawing Sheets

(56) References Cited

U.S. PATENT DOCUMENTS

| | | | |
|---|---|---|---|
| 2008/0284678 A1* | 11/2008 | Randel et al. | 345/55 |
| 2009/0201177 A1* | 8/2009 | Soler | 340/974 |
| 2009/0243819 A1* | 10/2009 | Pala et al. | 345/84 |
| 2011/0075267 A1* | 3/2011 | Sugiyama | 359/630 |
| 2012/0303603 A1* | 11/2012 | Kim et al. | 345/173 |
| 2013/0057594 A1* | 3/2013 | Pryor | 345/690 |
| 2013/0222212 A1* | 8/2013 | Lorenz et al. | 345/7 |
| 2013/0229522 A1* | 9/2013 | Schofield et al. | 348/148 |

FOREIGN PATENT DOCUMENTS

| | | |
|---|---|---|
| DE | 10349673 | 5/2005 |
| DE | 102004055835 | 2/2006 |
| DE | 102007061962 | 7/2008 |
| JP | 2-042828 | 3/1990 |
| JP | 2006-290044 | 10/2006 |
| JP | 2008-001120 | 1/2008 |

* cited by examiner

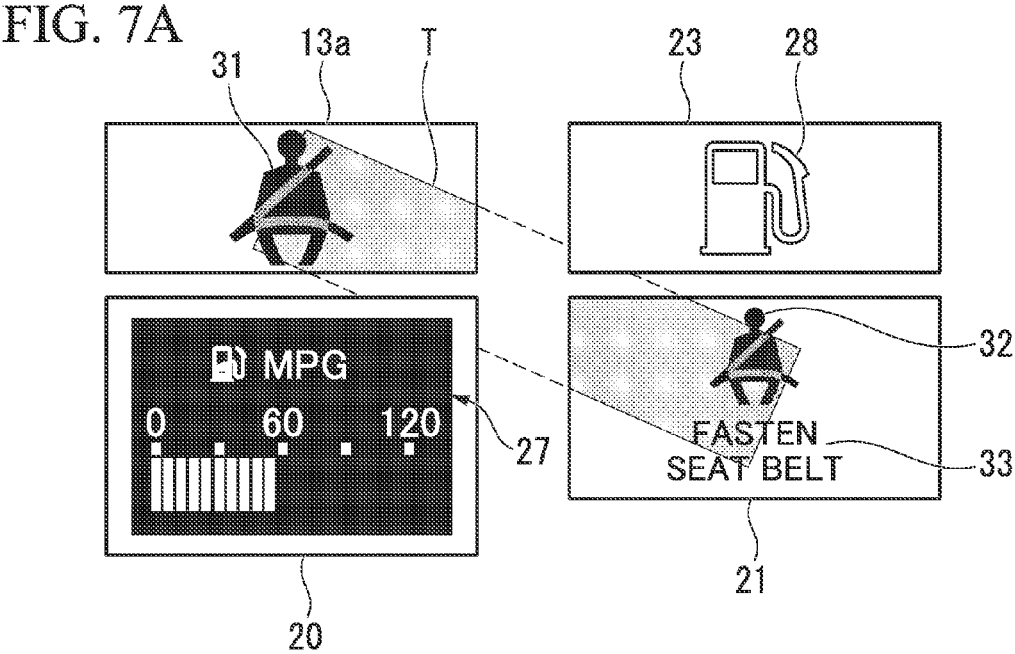
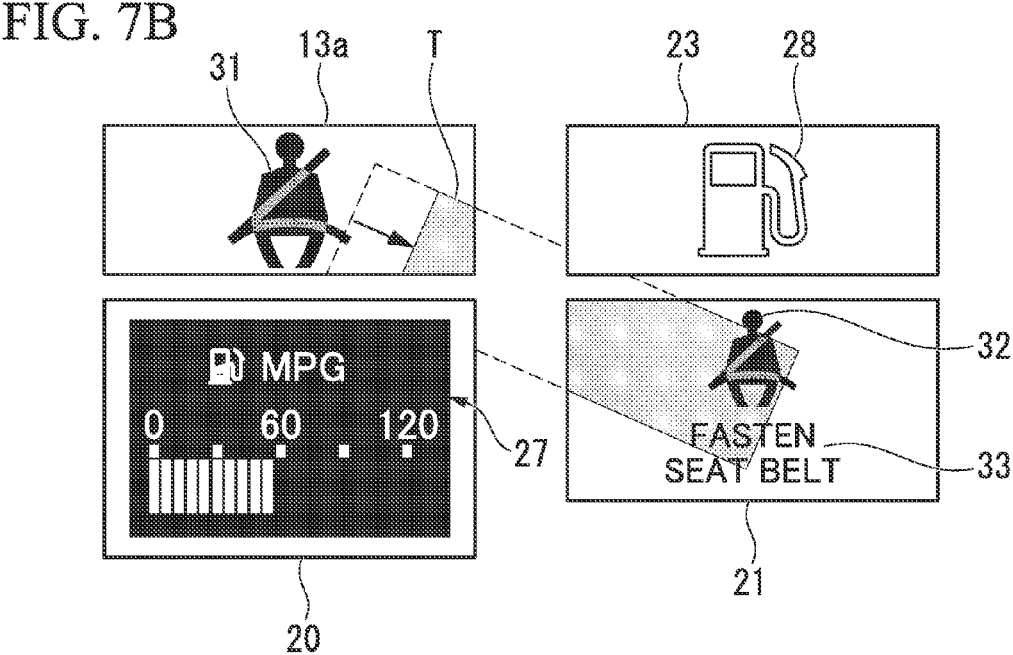

DISPLAY DEVICE FOR VEHICLE

CROSS-REFERENCE TO RELATED APPLICATION

This is the U.S. National Phase Application under 35 U.S.C. §371 of International Patent Application No. PCT/JP2010/069412 filed Nov. 1, 2010, which designated the United States and was published in a language other than English, which claims the benefit of Japanese Patent Application No. 2009-252763 filed on Nov. 4, 2009, both of them are incorporated by reference herein. The International Application was published in Japanese on May 12, 2011 as WO2011/055699 A1 under PCT Article 21(2).

BACKGROUND OF THE INVENTION

1. Field of the Invention

The present invention relates to a display device for a vehicle.

2. Background Art

A display device for a vehicle, which displays information on a plurality of displays provided in the vehicle, is conventionally disclosed.

In the vehicle provided with the plurality of displays in this way, even when a user looks at a display change carefully, in practice it is difficult to grasp all of the current display conditions.

Therefore, in recent years, for example, there has been disclosed a technology which moves an icon, displayed on a second side display, toward a first side display, or the like to display the presence or absence of a change in a display state of another display on a predetermined display, thereby reducing the number of times of visual recognition of a display whose display state does not change (for example, refer to Japanese Unexamined Patent Application, First Publication No. 2008-001120).

However, in the above-described display device for a vehicle in the related art, in a case where three or more displays are present, there is a problem in that it is difficult to grasp that information displayed on whichever of the displays has been updated until the movement of the icon is started or terminated, and as a result, visual recognition of the display takes a long time.

SUMMARY OF THE INVENTION

The present invention has been made in consideration of the above-described circumstances, and an object of the invention is to provide a display device for a vehicle that is capable of reducing the time taken for visual recognition of a display screen by efficiently performing movement of the line of sight.

In order to solve the above problems, a display device for a vehicle of a first aspect of the invention includes: a plurality of display screens provided at positions close to an instrument panel of the vehicle or the instrument panel, the display screens including at least a first display screen and a second display screen different from the first display screen; and a display control device showing, on the second display screen, that a display state of the first display screen is changed when the display state of the first display screen is changed. In the display device for a vehicle, a displayed image which is displayed on the display screens includes a first layer and a second layer, the first layer displays a predetermined image which is to be background, the second layer is overlapped with the first layer so as to make a part of the image displayed on the first layer visible, the second layer displays information related to the vehicle using characters or an icon. In the display device for a vehicle, when the display state of the first display screen is changed, the display control device displays the information on the second layer of the first display screen using characters or an icon, the display control device displays, on the second layer of the second display screen, the icon corresponding to the information which was displayed on the second layer of the first display screen, the display control device displays the predetermined image so that the predetermined image displayed on the first layer of the first display screen is different from the predetermined image displayed on the first layer of the second display screen, thereafter, the display control device gradually changes the image displayed on the first layer of the first display screen so that a part of or the entirety of the predetermined image displayed on the first layer of the first display screen is the same as the predetermined image displayed on the first layer of the second display screen.

In order to solve the above problems, a display device for a vehicle of a second aspect of the invention includes: a plurality of display screens provided at positions close to an instrument panel of the vehicle or the instrument panel, the display screens including at least a first display screen and a second display screen different from the first display screen; and a display control device showing, on the second display screen, that a display state of the first display screen is changed when the display state of the first display screen is changed. In the display device for a vehicle, a displayed image which is displayed on the display screens includes a first layer and a second layer, the first layer displays a predetermined image which is to be background, the second layer is overlapped with the first layer so as to make a part of the image displayed on the first layer visible, the second layer displays information related to the vehicle using characters or an icon. In the display device for a vehicle, when the display state of the first display screen is changed, the display control device displays the information on the second layer of the first display screen using characters or an icon, the display control device displays, on the second layer of the second display screen, the icon corresponding to the information which was displayed on the second layer of the first display screen, the display control device displays the predetermined image on the first display screen and the second display screen so that the predetermined image showing a continuous shape crosses over the first layer of the first display screen and the first layer of the second display screen.

In the display device for a vehicle of the second aspect of the invention, it is preferable that, after a predetermined time has elapsed after the display state of the first display screen is changed, the display control device control the second display screen so that the predetermined image is gradually removed from the second display screen along a direction from the second display screen to the first display screen due to the predetermined image displayed on the first layer of the second display screen, the icon displayed on the second layer of the second display screen is removed, and a display state of the second display screen returns to the display state of the second display screen at the most recent time the display state of the first display screen is changed.

In the display device for a vehicle of the first and the second aspects of the invention, it is preferable that the second display screen be a head-up display having a display portion provided on a front glass of the vehicle, and the first display screen be a display screen visible to a driver at a position lower than that of the head-up display.

Advantageous Effects of Invention

In the display device for a vehicle of the first aspect of the invention, when the display state of the first display screen is changed and the formation is displayed on the second layer of the first display screen using characters or an icon, the icon, which corresponds to the information shown by the characters or the icon of the second layer of the first display screen, is displayed on the second layer of the second display screen.

Consequently, the images different from each other are displayed on the first layer of the first display screen and the first layer of the second display screen, and a part of or the entirety of the images displayed on the first layer of the first display screen are gradually changed so that the image displayed on the first layer of the second display screen becomes the same as the image displayed on the first layer of the first display screen.

For this reason, even while the image of the first layer of the first display screen is changed, a user can grasp whichever of the display screens is being changed.

Accordingly, the user can grasp the change in the first display screen more quickly than in the case where icons move in the second display screen used in conventional cases.

Therefore, the user can effectively perform the movement of the line of sight, and the time taken to visually recognize the display screen may be reduced.

In addition, in the case where the icon is displayed on the second layer of the second display screen and the characters are displayed on the second layer of the first display screen, for example, detailed information related to the icon of the second display screen is displayed on the first display screen using characters or the like, it is possible to display the information while being distributed. Consequently, the display space can be effectively used.

In the display device for a vehicle of the second aspect of the invention, when the display state of the first display screen is changed, if at least characters or an icon or information is displayed on the second layer of the first display screen, the icon corresponding to the information which is displayed on the second layer of the first display screen by use of at least characters or an icon is displayed on the second layer of the second display screen.

Consequently, a predetermined image is displayed on the first display screen and the second display screen so that the predetermined image having a continuous shape crosses over the first layer of the first display screen and the first layer of the second display screen.

As described above, since the predetermined image having a continuous shape which is displayed on the first layer of the second display screen is also displayed on the first layer of the first display screen, it is possible for the user to immediately grasp the first display screen in which the change occurs among the plurality of display screens.

As a result, the user can grasp the change in the first display screen more quickly than in the case where icons move in the second display screen such as a conventional case.

Therefore, the user can effectively perform the movement of the line of sight, and the time taken to visually recognize the display screen may be reduced.

In addition, in the case where the icon is displayed on the second layer of the second display screen and the characters are displayed on the second layer of the first display screen, for example, detailed information related to the icon of the second display screen is displayed on the first display screen using characters or the like, it is possible to display the information while being distributed. Consequently, the display space can be effectively used.

In the display device for a vehicle of the second aspect of the invention, after the contents which are displayed on the first display screen is changed and the user understands the contents, the display state of the display screen is quickly back to the original display state; therefore, convenience is improved.

Furthermore, since a predetermined image is gradually removed along the direction from the second display screen toward the first display screen, it is possible to reliably inform the user of information, which is related to the conditions of the vehicle and is displayed on the first display screen, while making the user to understand the direction from the second display screen toward the first display screen.

In the display device for a vehicle of the first aspect or the second aspect of the invention, the second display screen is the display portion of the head-up display provided on the front glass of the vehicle. Additionally, the first display screen is the display screen visible at the position lower than the display portion of the head-up display.

Consequently, due to the image of the first layer and the icon of the second layer of the display portion, which is provided on the front glass making the driver easily aware, the driver can understand that the display state of the first display screen is changed.

As a result, the driver can relatively quickly recognize that the display state of the first display screen is changed.

BRIEF DESCRIPTION OF THE DRAWINGS

FIG. 7A is a view showing a display example corresponding to FIG. 4A in the second embodiment of the invention.

FIG. 7B is a view showing a display example corresponding to FIG. 4B in the second embodiment of the invention.

DESCRIPTION OF THE PREFERRED EMBODIMENTS

Hereinafter, a display device for a vehicle according to an exemplary embodiment of the invention will be described with reference to the accompanying drawings.

Figure 1:
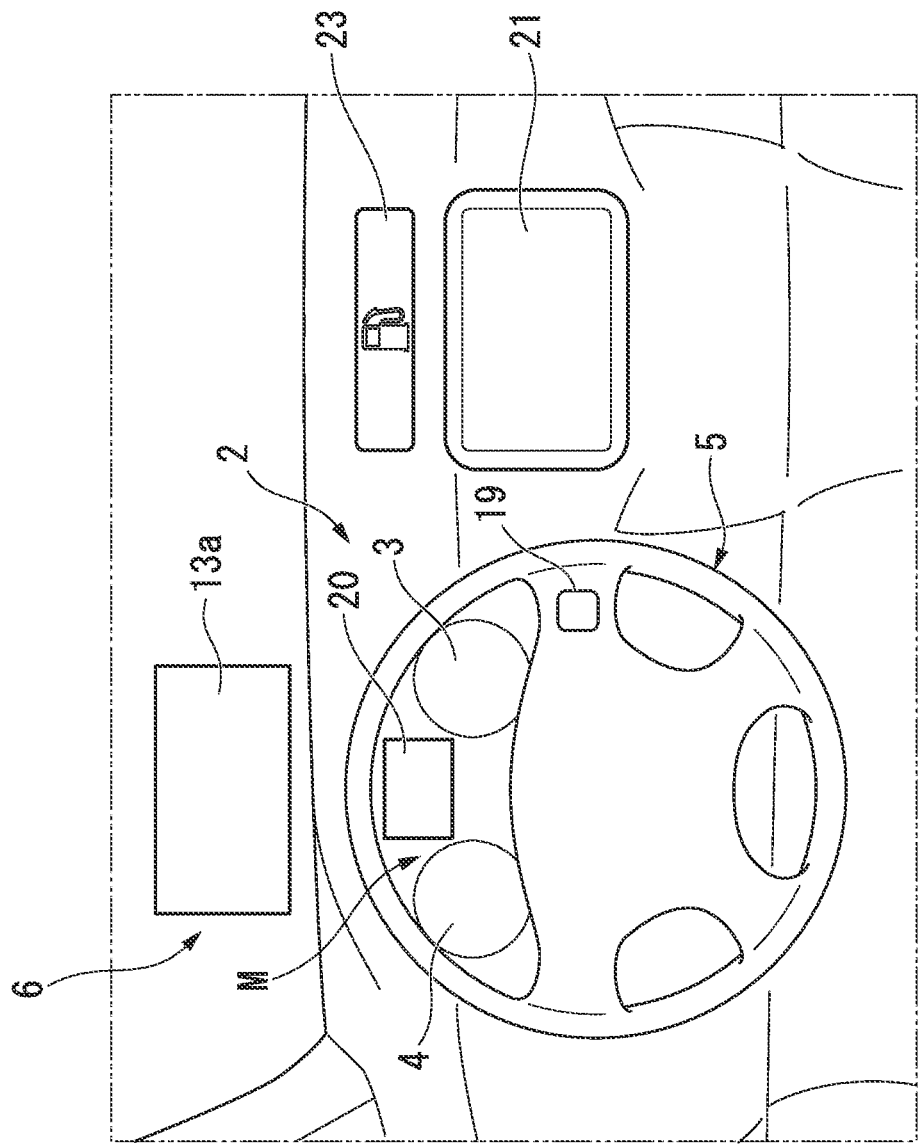
FIG. 1 is a view showing an arrangement of a HUD display portion, a MID, a dashboard display, and a touch panel in a first embodiment of the invention.

As shown in FIG. 1, in a vehicle interior at the front of the vehicle, an instrument panel 2 is disposed along a vehicle width direction.

In the instrument panel 2, a meter panel portion M including meters such as a vehicle speed meter 3 and an engine rpm meter 4 are disposed in front of driver's seat.

At substantially the center of the meter panel portion M, a MID (Multi Information Display) 20, which displays various pieces of vehicle information by a liquid crystal display or the like, is disposed.

In addition, an HUD display portion 13a, which display an image of an HUD (Head Up Display), is provided at an upper side of the meter panel portion M of the instrument panel 2.

In this embodiment, a projection type HUD that projects an image onto a front glass 6 is illustrated as an example, but a display device, which displays an image at a location in front of the driver's seat and at an upper side of the instrument panel 2, may also be adopted.

Furthermore, a touch panel 21 is also provided at substantially the center portion of the instrument panel 2 that extends horizontally, and a dashboard display 23, which displays various pieces of vehicle information, is disposed at an immediately upper side of the touch panel and at an upper side position in the vertical direction of the vehicle in relation to the meter panel portion M.

A steering wheel 5 is rotatably provided at the rear side of the meter panel portion M in the vehicle.

A steering switch 19, which can be operated by a crew member, is provided at a spoke portion of the steering wheel 5.

Here, among the HUD display portion 13a, the MID 20, the touch panel 21, and the dashboard display 23, the HUD display portion 13a is disposed at the highest position in the height direction of the vehicle, and the dashboard display 23, the MID 20, and the touch panel 21 are disposed at lower positions in this order.

Among the HUD display portion 13a, the MID 20, the touch panel 21, and the dashboard display 23, the HUD display portion 13a is disposed at the closest position with respect to a line of sight position (in other words, a position of the front glass 6 at the front of the vehicle in related to the driver's seat) of a driver when the vehicle travels straightly, and the MID 20, the dashboard display 23, and the touch panel 21 are disposed at position distant from the line of sight in this order.

Figure 2:
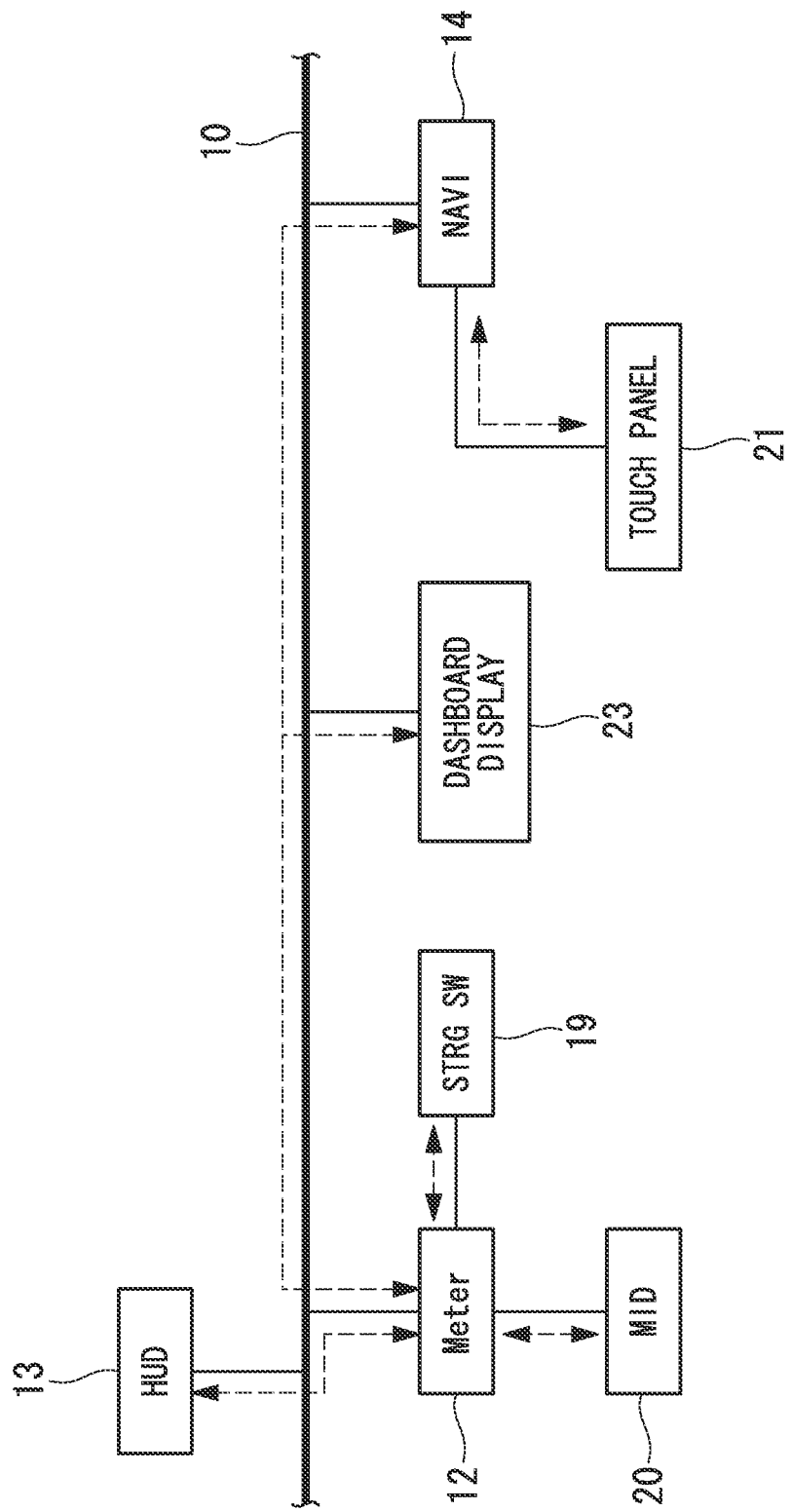
FIG. 2 is a block diagram illustrating a system for a display device for a vehicle of the first embodiment of the invention.

FIG. 2 illustrates a system configuration of the display device 1 for a vehicle according to a first embodiment.

As shown in FIG. 2, the vehicle is provided with a CAN (Controller Area Network) 10 as a communication line.

A meter unit (a display control device) 12, an HUD unit 13, a car navigation unit (NAVI) 14, and the dashboard display 23 are connected to the CAN 10.

A sensor (not shown), which detects various pieces of vehicle information such as a vehicle speed and an engine rpm, is connected to the CAN 10, and the various pieces of vehicle information that are detected are input to the meter unit 12 or the like via the CAN 10.

The HUD unit 13 makes up an HUD together with the HUD display portion 13a.

The HUD unit 13 virtually displays an image including the various pieces of vehicle information with respect to the HUD display portion 13a above the instrument panel 2 by, for example, transmitted illumination of a liquid crystal display or the like.

The car navigation unit 14 has a navigation function that obtains a current position of a vehicle on the basis of a GPS signal or the like, which is received from a GPS satellite, or that displays a route guidance from a predetermined position to a destination, or an audio function that reproduces music or the like and outputs the music or the like through a speaker.

The touch panel 21 is connected to the car navigation unit 14, and may display operation buttons of the navigation function and the audio function, setting items such as a volume, or a map for navigation, route information, or the like.

A display control of the touch panel 21 is performed by the car navigation unit 14 via, for example, a general purpose web browser or the like.

The above-described HUD unit 13 and the car navigation unit 14 perform a display control of correlated warning (described later) on a display screen of the HUD display portion 13a and a display screen of the touch panel 21 via the CAN 10 on the basis of a control instruction of the muter unit 12.

The meter unit 12 performs an operation control of meters of the meter panel portion M, a control to display various pieces of vehicle information (maintenance information or the like) on the MID 20, and a control such as a conversion of items displayed on the MID 20, on the basis of the various pieces of vehicle information such as the vehicle speed and the engine rpm, which are input via the CAN 10, or input information that is input to the steering switch 19.

In addition, the meter unit 12 outputs a control instruction to the HUD unit 13 via the CAN 10 to control an image display in the HUD display portion 13a, and outputs a control instruction with respect to the dashboard display 23 via the CAN 10 to perform a display control.

Furthermore, in a case where vehicle conditions satisfy a predetermined warning display condition that are set in advance, on the basis of the various pieces of vehicle information that are input via the CAN 10, the meter unit 12 determines there is an alarm (hereinafter, referred to as a warning), and performs a display control of the warning.

Figure 4A:
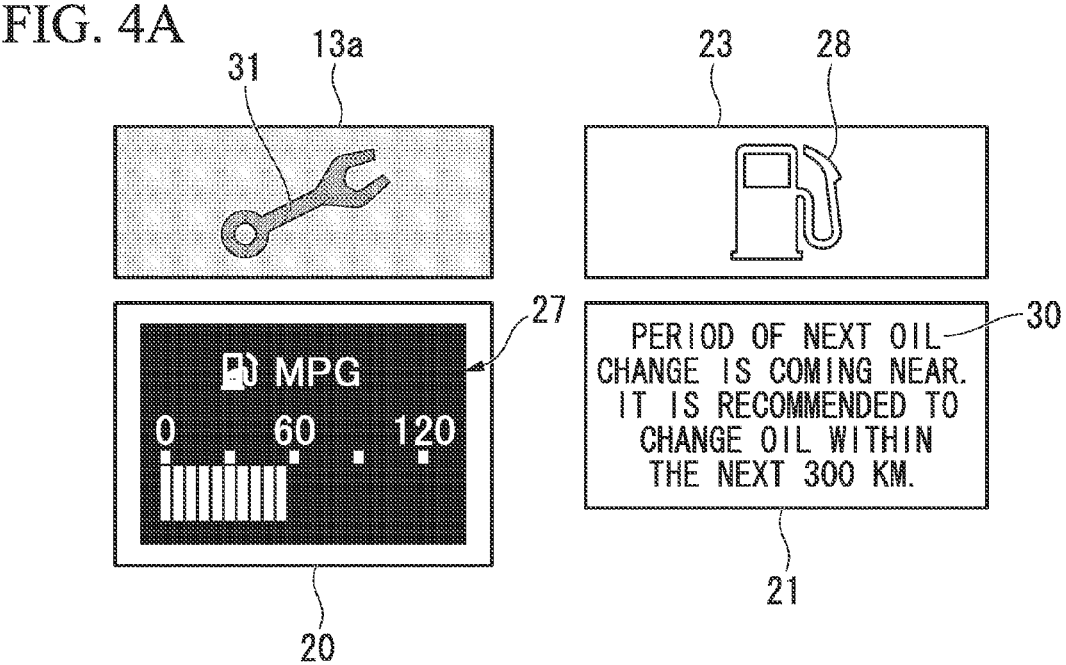
FIG. 4A is a display example showing the HUD display portion, the MID, the dashboard display, and the touch panel in the first embodiment of the invention.
Figure 4B:
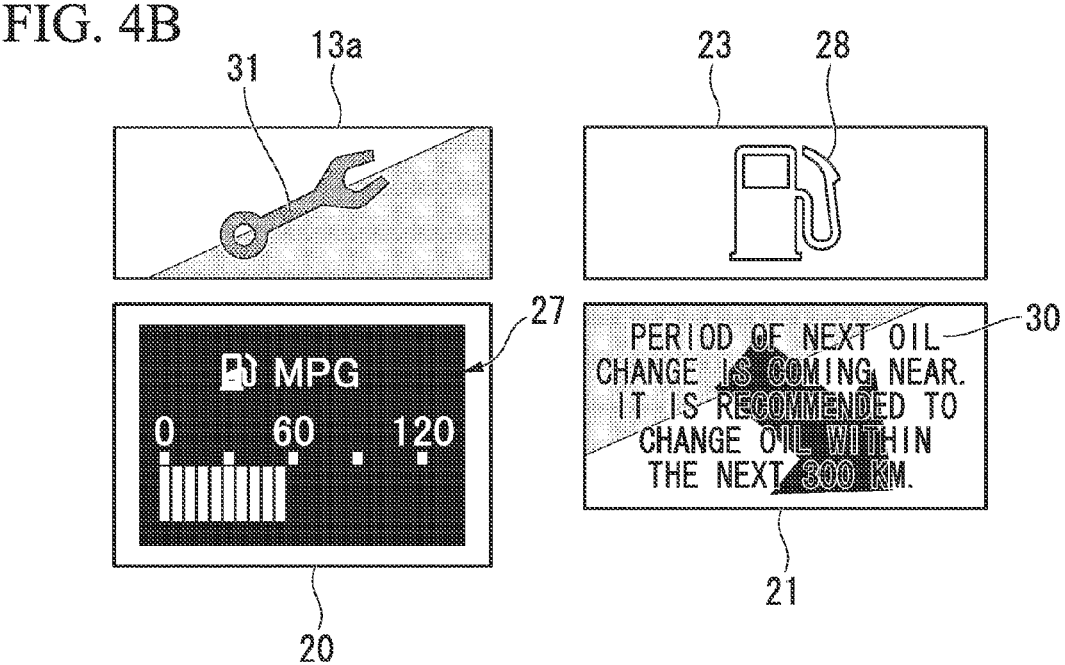
FIG. 4B is a display example showing the HUD display portion, the MID, the dashboard display, and the touch panel in the first embodiment of the invention.

Here, each of images, which are displayed on the HUD display portion 13a, the MID 20, the touch panel 21, and the dashboard display 23, includes a first layer that displays a background image including various colors and patterns, and a second layer that displays characters 30 or icon 31 related to vehicle information (including warning) by being overlapped with the first layer (refer to FIGS. 4A and 4B).

The display control of the first layer and the second layer can be performed individually.

In this embodiment, a case in which the warning is determined by the meter unit 12 and a display control of the warning is performed will be described as an example.

However, for example, the same display control may be performed by the car navigation unit 14 or the HUD unit 13.

Furthermore, in this embodiment, a case in which various units such as the meter unit 12, the HUD unit 13, the car navigation unit 14, and the dashboard display 23 are connected to the CAN 10 is described as an example, but it is not limited to the CAN 10 and for example, a network compliant to a communication standard may be used in addition to the CAN 10.

Among the various units, some units may be connected to each other via a dedicated communication line.

Figure 3:
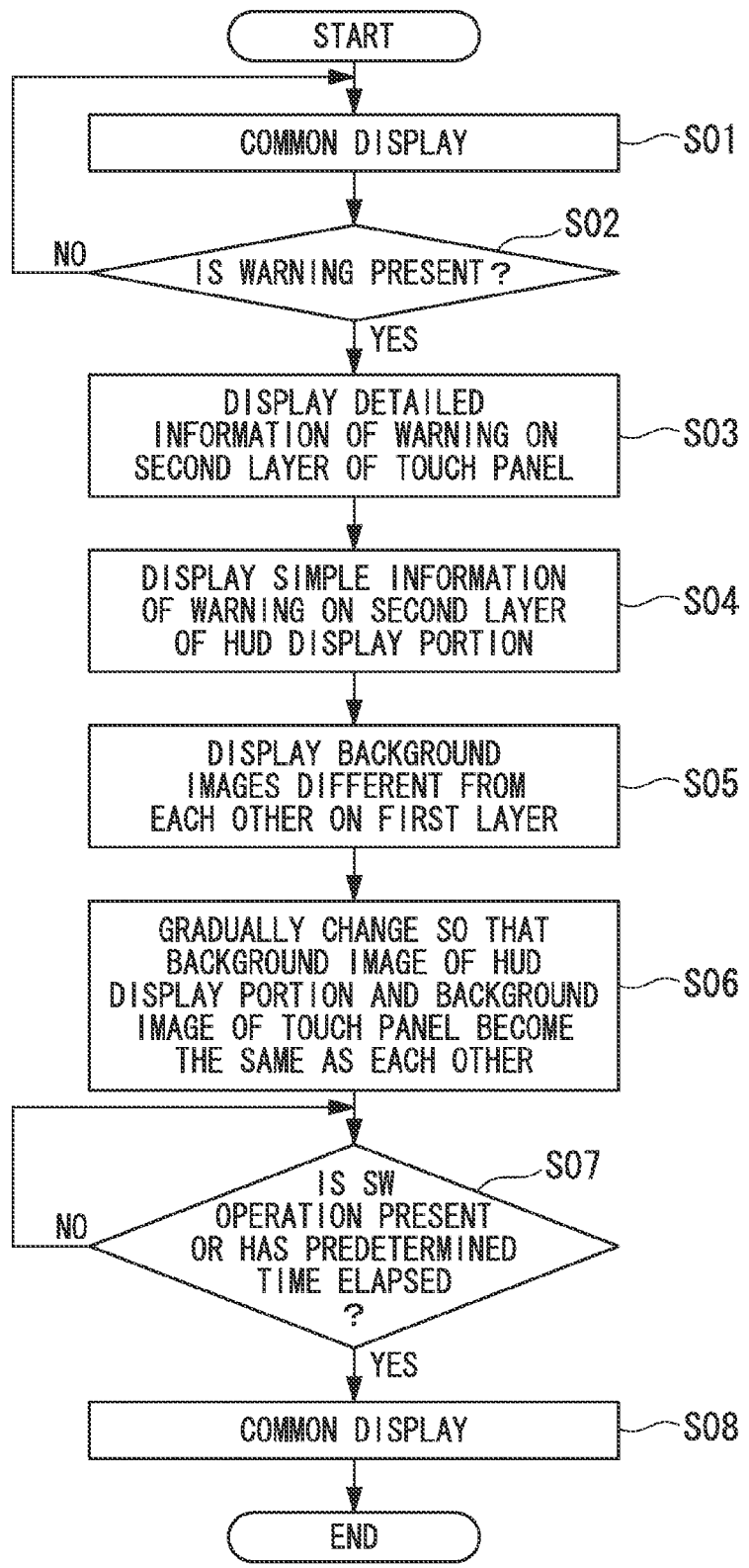
FIG. 3 is a flow chart illustrating control processes in the display device for a vehicle of the first embodiment of the invention.

The display device 1 for a vehicle according to this embodiment has the above-described configuration, Next, an operation of the display device 1 for a vehicle will be described with reference to a flow chart shown in FIG. 3.

In the description of the operation according to this embodiment, among the plurality of display screens including the HUD display portion 13a, the MID 20, the touch panel 21, and the dashboard display 23, a case in which the touch panel 21 is a first display screen, the HUD display portion 13a is a second display screen, detailed information of the warning is displayed on the touch panel 21, and simple information of the warning is displayed on the HUD display portion 13a will be described as an example.

Here, the second display screen is a specific display screen that is set in advance, and the first display screen is a display screen other than the second display screen, which is determined at random in response to a kind of the warning.

That is, in this embodiment, only the HUD display portion 13a corresponds to the second display screen, other than this, the MID 20, the touch panel 21, and the dashboard display 23 correspond to the first display screen.

First, a common display control, that is, a common display control in which the display control of the warning of the vehicle is not performed is performed with respect to the touch panel 21 and the HUD display portion 13a (step S01).

FIGS. 4A and 4B illustrate a case in which a fuel meter 27 is displayed on the second layer of the MID 20 as detailed information at the time of a common display, and an icon 28 related to fuel is displayed on the second layer of the dashboard display 23 as the simple information at the time of the common display.

Next, it is determined whether or not the warning to be displayed is present on the basis of various pieces of vehicle information, which are input via the CAN 10 (step S02).

From the result of the determination, in a case where it is determined that the warning is not present (No in step S02), the common display continues.

On the other hand, in a case where it is determined that the warning is present, the detailed information of the warning is displayed on the second layer of the touch panel 21 (step S03), and the simple information of the warning is displayed on the second layer of the HUD display portion 13a (step S04).

Here, FIG. 4A illustrates a display example of the warning in a case where it is determined that a predetermined time, which is set in advance, has elapsed from the previous oil exchange.

For example, characters 30 of "a period of next oil change is coming near. It is recommended to change oil within 300 km from now" are displayed as the detailed information of the warning with respect to the second layer of the touch panel 21.

On the other hand, an icon 31 that indicates maintenance as the simple information of the warning that is the same as the above-described warning is displayed with respect to the second layer of the HUD display portion 13a.

In addition, when the detailed information and the simple information are displayed on the second layers, respectively, different colors of background images are displayed, for example, the first layer of the HUD display portion 13a is displayed with a red color, and the first layer of the touch panel 21 is displayed with a white color, or the like, so that the image of the first layer of the HUD display portion 13a and the image of the first layer of the touch panel 21, which serve as background images of the second layer, become images different from each other (step S05).

Then, the first layer of the touch panel 21 is gradually changed so that the first layer of the touch panel 21 and the first layer of the HUD display portion 13a become the same as each other (step S06).

More specifically, as shown in FIG. 4B, in a direction (in the figure, a direction indicated by an arrow) facing from a position (a corner portion) in the touch panel 21, which is close to the HUD display portion 13a, to a position (a corner portion) in the touch panel 21, which is distant from the HUD display portion 13a, the background color of the first layer of the touch panel 21 is gradually changed so that the background color of the first layer of the touch panel 21 becomes the same as the background color of the first layer of the HUD display portion 13a before the change of the first layer.

In FIG. 4B, when the first layer of the touch panel 21 is gradually changed, in a direction from a position (a corner portion) in the HUD display portion 13a, which is distant from the touch panel 21, to a position (a corner portion) in the HUD display portion 13a, which is close to the touch panel 21, the background color of the first layer in the HUD display portion 13a is gradually changed, and thereby the background color of the first layer in the HUD display portion 13a is made to return to the background color of the first layer before displaying the simple information.

However, while the simple information is displayed on the second layer, the display state of the first layer and the second layer of the HUD display portion 13a may be maintained as it is without changing the background color of the first layer of the HUD display portion 13a.

In addition, it is determined whether or not an operation input is present in the steering switch 19, or a predetermined time has elapsed.

From the result of the determination, in a case where any one of the operation input and the elapse of a predetermined time is not present (No in step S07), the display control of the warning continues.

In a case where it is determined that the operation input is present, or the predetermined time has elapsed (Yes in step S07), the display control of the warning is terminated, and the common display control is restarted, and the above-described serial processes are terminated.

In step S07 described above, when the operation input by the steering switch 19 is performed, even while the first layer of the touch panel 21 is changed, that is, even in a state where a part of the first layer of the touch panel 21 is changed, the process of the display control of the warning is terminated.

In addition, in a case where the change of the first layer of the touch panel 21 is terminated and the entirety of the first layer of the touch panel 21 becomes the same as the background image of the first layer of the HUD display portion 13a before the change, this display state is maintained until it is determined that the operation input of the steering switch 19 is present or the predetermined time has elapsed and thereby the process is terminated.

That is, in the above-described first embodiment, the display state of the touch panel 21 is changed into the warning display on the first display screen among the plurality of display screens, for example, the warning information is displayed on the second layer of the touch panel 21 with the characters 30.

Subsequently, the icon 31, which corresponds to the information displayed by the characters 30 that is displayed on the second layer of the touch panel 21, is displayed on a second display screen other than the touch panel 21, for example, the second layer of the HUD display portion 13a.

Furthermore, the background image of background colors different from each other is displayed on the first layer of the touch panel 21 and the first layer of the HUD display portion 13a.

Then, the background image that is displayed on the first layer of the touch panel 21 is gradually changed so that the background image that is displayed on the first layer of the HUD display portion 13a and the background image that is displayed on the first layer of the touch panel 21 become the same background image as each other.

Therefore, even while the image of the first layer of the touch panel 21 is changed, a user may grasp that the touch panel 21 is changed.

Therefore, it is possible for the user to relatively quickly grasp the change in the touch panel 21 that is a first display screen compared to a case in which the icon is made to move in the second display screen like in the related art.

As a result, the user may effectively perform the movement of the line of sight, and the time taken to visually recognize the display screen can be reduced.

In the above-described first embodiment, the icon 31 is displayed on the second layer of the HUD display portion 13a as the simple information, and the characters 30 are displayed on the second layer of the touch panel 21 as the detailed information related to this icon.

In this manner, the vehicle information can be displayed while being distributed, the display space can be effectively used.

Furthermore, in the above-described first embodiment, the second display screen is the HUD display portion 13a that is provided on the front glass 6 of a vehicle, and the first display screen is the touch panel 21 of the car navigation unit 14 that is disposed at a position that is lower than that of the HUD display portion 13a.

Therefore, the driver may recognize that the display state of the touch panel 21 is changed by the display of the icon 31 and the background image at the HUD display portion 13a that is closest in the line of sight direction of the driver at the time of driving the vehicle and therefore it is easy to be aware thereof.

As a result, the driver may relatively quickly recognize that the display state of the touch panel 21 is changed.

In the first embodiment, the description is made with respect to a case in which the entirety of the background image of the first layer of the touch panel 21 is gradually changed so that the entirety of the background image of the first layer of the touch panel 21 becomes the same as the background image of the first layer of the HUD display portion 13a, but a part of the first layer of the touch panel 21 and not the entirety thereof may be changed.

In the above-described first embodiment, the description is made with respect to a case in which the display of the characters 30 are displayed as the detailed information of the warning on the touch panel 21 that is the first display screen, but it is not limited to the character display as long as the amount of information is larger than that of the simple information of the warning in the second display screen.

Figure 5A:
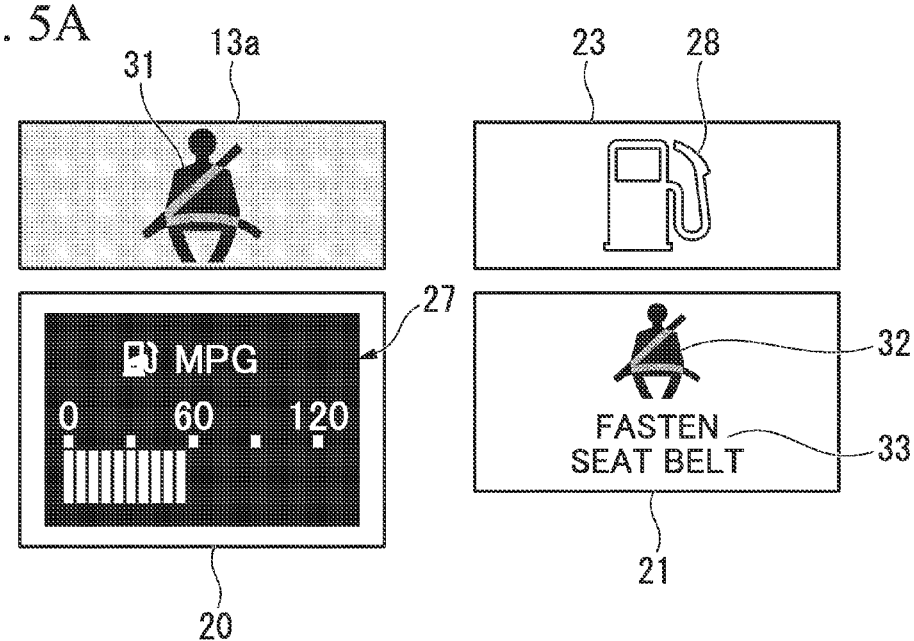
FIG. 5A is a view showing a display example corresponding to FIG. 4A in a modified example of the first embodiment of the invention.
Figure 5B:
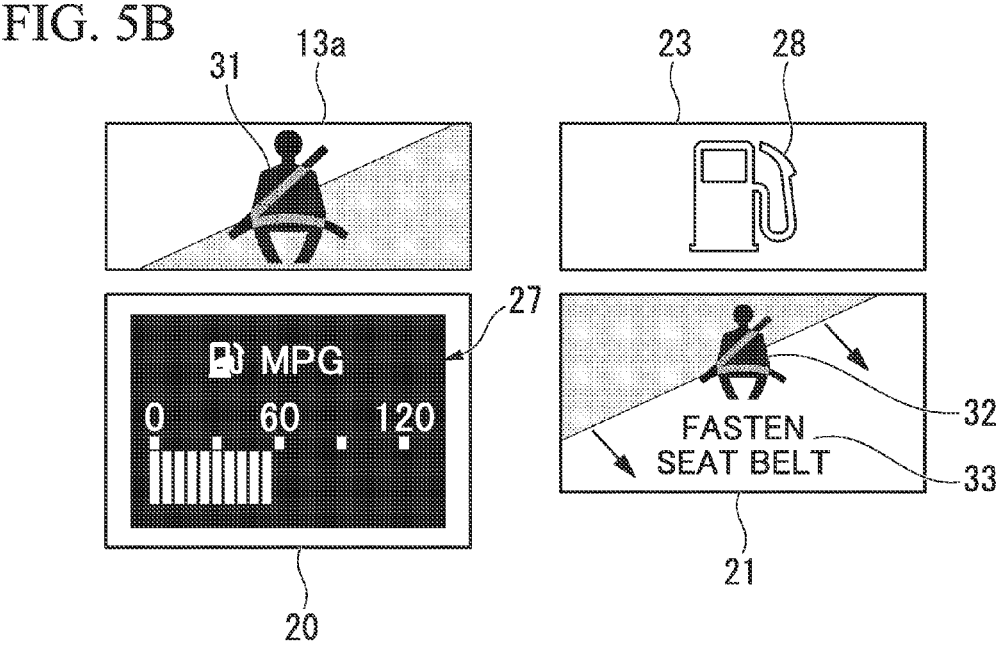
FIG. 5B is a view showing a display example corresponding to FIG. 4B in a modified example of the first embodiment of the invention.

For example, like the modification shown in FIGS. 5A and 5B, the icon 32 and the characters 33 may be combined and then may be displayed on the first display screen, or only an icon (not shown) having an amount of information larger than that of the simple information of the warning in the second display screen may be displayed on the first display screen.

FIGS. 5A and 5B illustrate a display example of a warning in a case where a seat belt is not worn.

In addition, in the above-described in the first embodiment, the description is given with respect to a case in which the first display screen is the touch panel 21 of the car navigation unit 14.

However, it is not limited to this configuration, and the first display screen may be any display screen as long as this display screen is disposed at a position lower than that of the second display screen, and the first display screen may be the MID 20, the dashboard display 23, and other display screens.

A second embodiment of the invention will be described with reference to FIGS. 6, 7A, and 7B.

In this second embodiment, the system configuration of the display device 1 for a vehicle according to the first embodiment is the same as that of a display device for a vehicle of the second embodiment, and the first embodiment and the second embodiment are different from each other with respect to a control process related to an image display.

Therefore, FIG. 1 of the first embodiment will be cited here, and description will be made by giving like reference numerals to the same parts as those in the first embodiment.

In the second embodiment, an example in which the first display screen is the touch panel 21, and the second display screen is the HUD display portion 13a similarly to the above-described first embodiment will be described.

Figure 6:
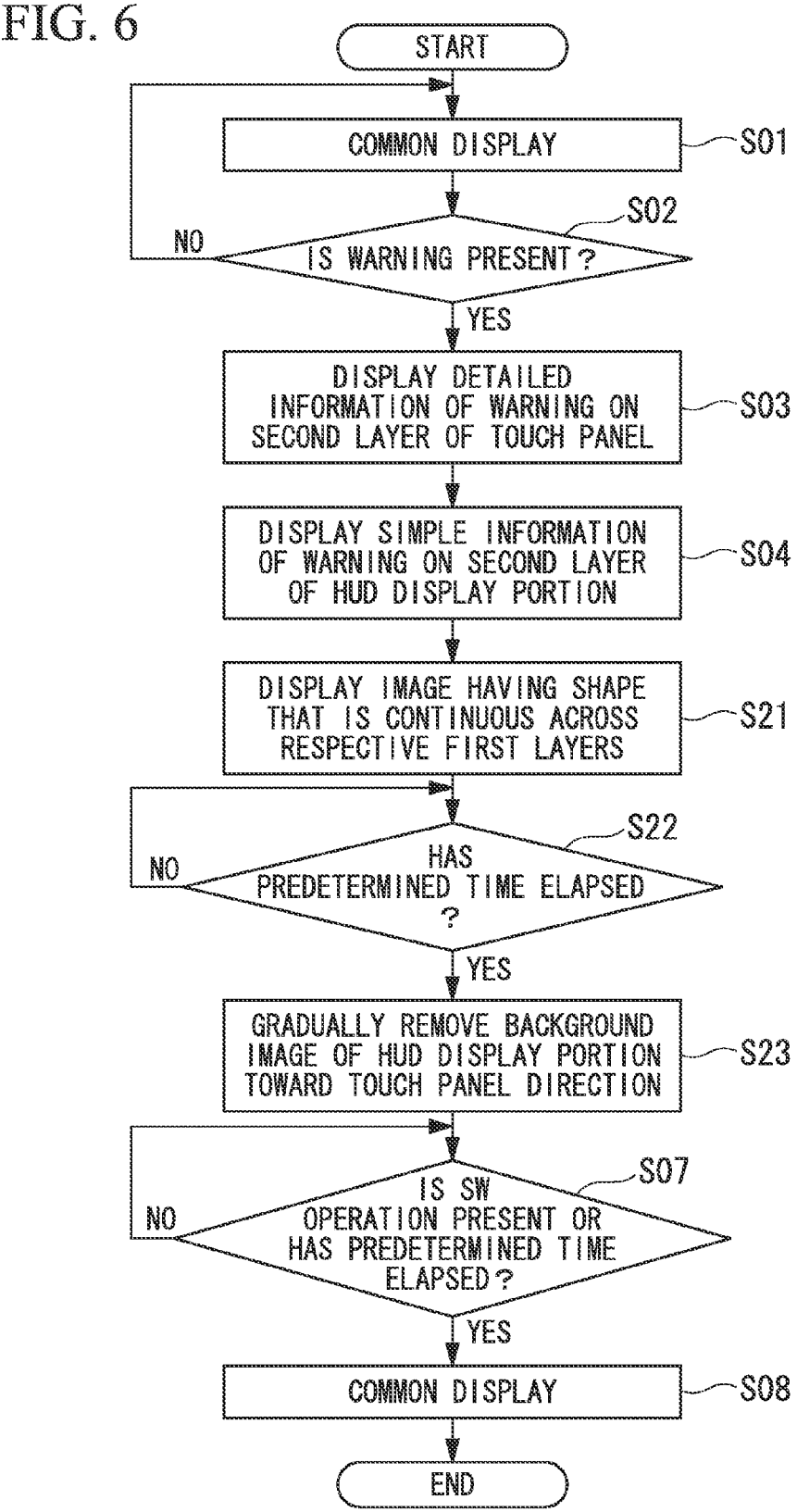
FIG. 6 is a flowchart corresponding to FIG. 3 in a second embodiment of the invention.

FIG. 6 shows a flow chart illustrating an operation of a display device 1 for a vehicle according to the second embodiment.

First, control processes of step S01 to step S04 are performed similarly to the first embodiment.

That is, in a case where the warning is present, detailed information of the warning is displayed on the second layer of the touch panel 21, and simple information thereof is displayed on the second layer of the HUD display portion 13a.

Then, an image having a shape that is continuous across the first layer of the HUD display portion 13a and the first layer of the touch panel 21, for example, as shown in FIG. 7A, a rectangular shape T (image) is displayed across the first layer of the HUD display portion 13a and the first layer of the touch panel 21 (step S21).

FIGS. 7A and 7B illustrate an example in which an icon 32 and characters 33 are displayed on the second layer of the touch panel 21 as the detailed information, but only the characters 33 may be displayed similarly to the first embodiment.

In addition, it is determined whether or not a predetermined time has elapsed after the image having a shape that is continuous across the respective first layers is displayed (step S22).

From the result of the determination, in a case where it is determined that a predetermined time has not elapsed (No in step S22), waits until it is determined that a predetermined time has elapsed.

On the other hand, in a case where it is determined that a predetermined time has elapsed (Yes in step S22), the image of the rectangular shape T, which is displayed on the first layer of the HUD display portion 13a, is gradually removed along a direction (in FIG. 7B, a direction indicated by an arrow) facing the touch panel 21 from the HUD display portion 13a, that is, the image of the rectangular shape T that is displayed at a position distant from the touch panel 21 is gradually removed (step S23).

Then, after the same processes as step S07 and step S08 in the first embodiment are performed, that is, after the control process of terminating the display of the warning and the process of restarting the common display control, the above-described serial processes are terminated.

That is, in the above-described second embodiment, when the display state of the touch panel 21 that is the first display screen is changed, for example, due to the warning, the detailed information is displayed on the second layer of the touch panel 21 as the characters 33 and the icon 32.

Next, the simple information, which corresponds to the detailed information displayed with characters 33 and the icon 32 on the second layer of the touch panel 21, is displayed with the icon 31 on the second layer of the HUD display portion 13a.

In addition, the image having a shape, for example, the rectangular shape T, which is continuous across the first layer of the touch panel 21 and the first layer of the HUD display portion 13a, is disposed across the touch panel 21 and the HUD display portion 13a.

In this manner, the rectangular shape T displayed on the first layer of the HUD display portion 13a is also displayed on the first layer of the touch panel 21, such that a user may immediately grasp the display screen in which the change occurs among the plurality of screens.

Therefore, it is possible for the user to relatively quickly grasp the change in the first display screen compared to a case in which the icon 31 is made to move in the second display screen like in the related art.

As a result, the user may effectively perform the movement of the line of sight, and the time taken to visually recognize the display screen can be reduced.

In addition, in the above-described second embodiment, the icon 31 is displayed on the second layer of the HUD display portion 13a as the simple information, and the characters 30 and the icon 32 are displayed on the second layer of the touch panel 21 as the detailed information related to the icon 31.

In this manner, the vehicle information can be displayed while being distributed, the display space can be effectively used.

In the above-described second embodiment, the description is made with respect to a case in which the rectangular shape T that is a shape continuous across the first layer of the first display screen and the first layer of the second display screen is displayed.

However, it is not limited to the rectangular shape T as long as an image has a continuous shape, and for example, an ellipse or the like may be used.

Furthermore, in the second embodiment, the description is made with respect to a case in which the characters 33 and the icon 32 are displayed as the detailed information on the second layer of the touch panel 21 that is the first display screen. However, as is the case with the first embodiment, only the characters 33 or only an icon having an amount of information larger than that of the simple information of the warning may be displayed as the detailed information.

In addition, in the first embodiment and the second embodiment, when the ignition of a vehicle is turned on, and more specifically, the display device 1 for a vehicle is activated, with respect to the HUD display portion 13a, the MID 20, the touch panel 21, and the dashboard display 23 that are the plurality of display screens, an image, which allows a crew member to recognize these are a group of display screens capable of displaying vehicle information related to each other, may be displayed.

Figure 8:
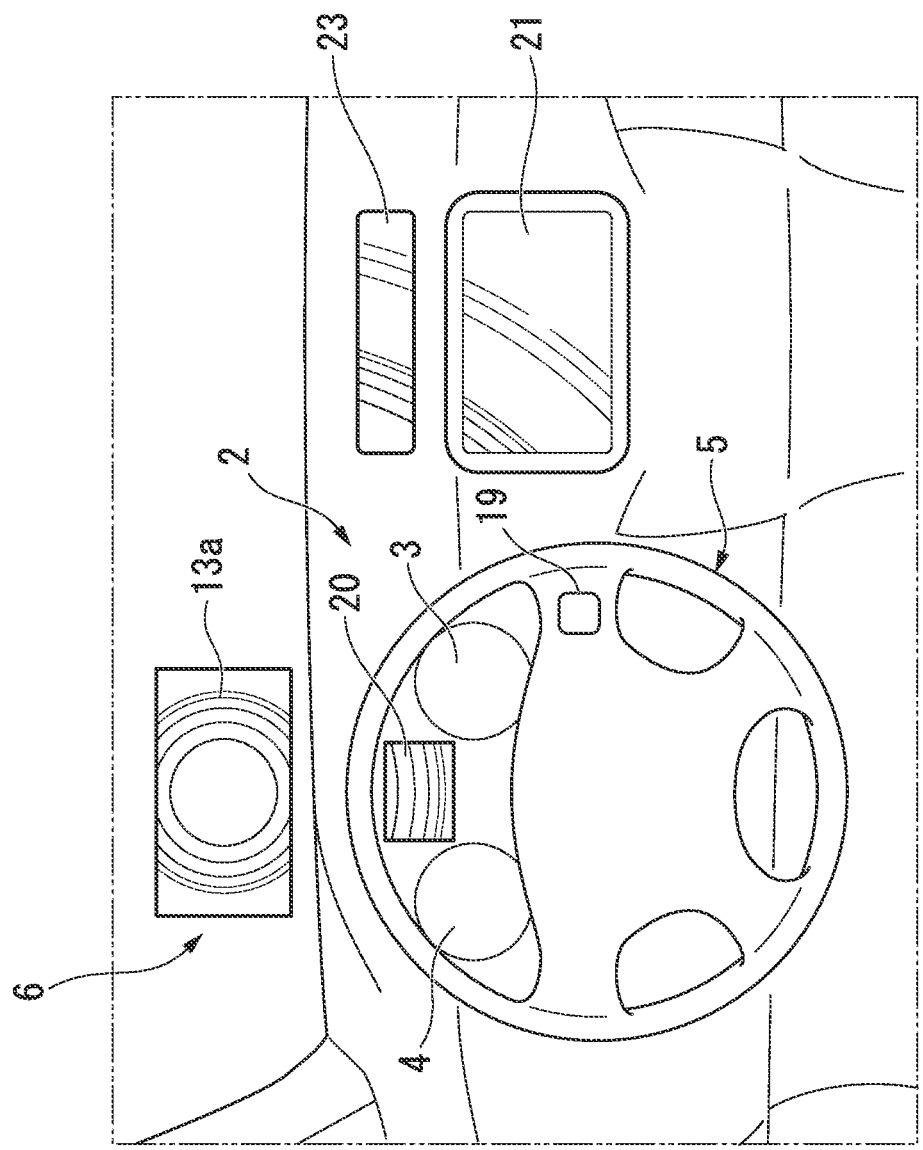
FIG. 8 is a display example showing the HUD display portion, the MID, the dashboard display, and, the touch panel at the time of activation in the first embodiment of the invention and the second embodiment of the invention.

As this image, for example, as shown in FIG. 8, a ripple pattern is displayed, in which a screen center of the HUD display portion 13a, which is a display screen that is easy for the crew member to be aware of, is made as the starting point.

At this time, with respect to the MID 20, the touch panel 21, and the dashboard display 23 that are display screens other than the HUD display portion 13a, the ripple pattern with the screen center of the HUD display portion 13a made as the starting point is displayed with a predetermined propagation timing in response to a distance from the HUD display portion 13a as if this ripple pattern propagates.

In the case of the layout of the display screens shown in FIG. 8, the ripple pattern is displayed from a side close to the HUD display portion 13a, that is, in the order of the MID 20, the dashboard display 23, and the touch panel 21.

When it is configured in this manner, the crew member may recognize the layout of the display screens and the display screens that are correlated with each other at the time of activation.

Therefore, when the vehicle information such as the warning is displayed on the plurality of display screens while being distributed, the crew member may immediately recognize the display screens.

The present invention is not limited to the above-described embodiments and modification, and a display screen other than the MID 20, the touch panel 21, and the dashboard display 23 may be used.

In addition, for example, in a case where the HUD unit 13 and the HUD display portion 13a are not mounted in a vehicle, the simple information may be displayed with the icon 31 on a first layer of a screen located at a position in the vehicle height direction, which is relatively easy for a driver to be aware of among the plurality of display screens and which is located at a relatively high position among these display screens.

INDUSTRIAL APPLICABILITY

According to the display device for a vehicle of the invention, a user may quickly grasp the change in the first display screen among the plurality of display screens.

Therefore, the user may effectively perform the movement of the line of sight, and the time taken to visually recognize the display screen may be reduced.

In addition, the information may be displayed on the first display screen and the second display screen while being distributed thereto, such that the display space may be effectively used.

What is claimed is:

1. A display device for a vehicle, comprising:
a plurality of display screens provided at positions close to an instrument panel of the vehicle or on the instrument panel, the display screens including at least a first display screen and a second display screen different from the first display screen; and
a display control device showing, on the second display screen, that a display state of the first display screen is changed when the display state of the first display screen is changed, wherein
a displayed image which is displayed on the display screens includes a first layer and a second layer, the first layer displays a predetermined image which is to be background, the second layer is overlapped with the first layer so as to make a part of the image displayed on the first layer visible, the second layer displays information related to the vehicle using characters or an icon,
when the display state of the first display screen is changed, the display control device displays the information on the second layer of the first display screen using characters or an icon, the display control device displays, on the second layer of the second display screen, the icon corresponding to the information which was displayed on the second layer of the first display screen, the display control device displays the predetermined image so that the predetermined image displayed on the first layer of the first display screen is different from the predetermined image displayed on the first layer of the second display screen, thereafter, the display control device gradually displays the predetermined image displayed on the first layer of the second display screen on the first layer of the first display screen in a direction from a position in the first display screen, which is close to the second display screen, to a position in the first display screen, which is distant from the second display screen, and the display control device gradually returns a display state of the first layer in the second display screen to a display state of the first layer in the second display screen at the most recent time before the display state of the first display screen is changed, in a direction from a position in the second display screen, which is distant from the first display screen, to a position in the second display screen, which is close to the first display screen.

2. The display device for a vehicle according to claim 1, wherein
the second display screen is a head-up display having a display portion provided on a front glass of the vehicle, and
the first display screen is a display screen visible to a driver at a position lower than that of the head-up display.

3. A display device for a vehicle, comprising:
a plurality of display screens provided at positions close to an instrument panel of the vehicle or on the instrument panel, the display screens including at least a first display screen and a second display screen different from the first display screen; and
a display control device showing, on the second display screen, that a display state of the first display screen is changed when the display state of the first display screen is changed, wherein
a displayed image which is displayed on the display screens includes a first layer and a second layer, the first layer displays a predetermined image which is to be background, the second layer is overlapped with the first layer so as to make a part of the image displayed on the first layer visible, the second layer displays information related to the vehicle using characters or an icon,
when the display state of the first display screen is changed, the display control device displays the information on the second layer of the first display screen using characters or an icon, the display control device displays, on the second layer of the second display screen, the icon corresponding to the information which was displayed on the second layer of the first display screen, the display control device displays the predetermined image on the first display screen and the second display screen so that the predetermined image showing a continuous shape crosses over the first layer of the first display screen and the first layer of the second display screen,
after a predetermined time is elapsed after the display state of the first display screen is changed, the display control device controls the second display screen so that the predetermined image is gradually removed from the second display screen along a direction from the second display screen to the first display screen due to the predetermined image displayed on the first layer of the second display screen, the icon displayed on the second layer of the second display screen is removed, and a display state of the second display screen returns to the display state of the second display screen at the most recent time before the display state of the first display screen is changed.

4. The display device for a vehicle according to claim 3, wherein
the second display screen is a head-up display having a display portion provided on a front glass of the vehicle, and
the first display screen is a display screen visible to a driver at a position lower than that of the head-up display.

\* \* \* \* \*